UNITED STATES PATENT OFFICE.

CYRUS FISHER, OF LEESVILLE, OHIO.

IMPROVED METHOD OF PREVENTING INSECTS FROM INJURING FRUIT-TREES, &c.

Specification forming part of Letters Patent No. 49,869, dated September 12, 1865.

*To all whom it may concern:*

Be it known that I, CYRUS FISHER, of Leesville, Carroll county, in the State of Ohio, have invented a certain new and useful Mode or Process of Preventing the Borer or other Insects from Injuring Fruit or other Trees; and I do hereby declare that the following is a full and exact description thereof, sufficient to enable any farmer to use my said process.

My process is intended for the protection of all kinds of valuable trees, both for fruit and shade or ornament; and it consists of three distinct operations, all of which are necessary in order to attain the best result.

First. I thoroughly cleanse the body of the tree by carefully washing it with good strong soft soap, using about one quart (more or less) to each tree.

Second. I then apply a wash of spirits of turpentine, about half a pint, to the body of the tree. The tree drinks in the turpentine, so that the whole bark and sap (and possibly the core) is so thoroughly impregnated with the odor as to drive all the borers or other worms down toward the roots of the tree. If there is fruit on the tree, and the fruit has been stung, I also sprinkle over the top of the tree a mixture consisting of about half a pint of spirits of turpentine and a gallon of strong lime-water. This sprinkling has the effect of assisting in driving away the insects and will prevent them from attacking the fruit.

Third. Some five or six days after the application of the turpentine to the body of the tree, and when it has soaked in, and killed or driven the worms down to the roots, I kill or drive the borer or other vermin from the roots of the trees by pouring around each tree about half a gallon of strong boiling lye in which has been dissolved half a pint of common salt. This solution is poured as close around the body of the tree as possible. Experience has proven to me that this hot solution not only does not injure the trees or vines, but greatly enhances their value.

By this very cheap and simple process I am enabled to protect valuable trees or vines from the ravages of the borer or other destructive vermin.

Having thus fully described my invention, what I claim as new, and desire to secure by Letters Patent, is—

1. The mode herein described of protecting trees or vines from insects, by the combined use of the three distinct applications, substantially as set forth.

2. Pouring a boiling solution of lye and salt around the roots of trees and vines, for the purposes specified.

In testimony that I claim the above I have hereunto set my hand this 29th day of July, 1865.

CYRUS FISHER.

In presence of—
  WM. ADAIR,
  J. L. HUNT.